United States Patent
Tao et al.

(10) Patent No.: US 11,847,569 B2
(45) Date of Patent: Dec. 19, 2023

(54) TRAINING AND APPLICATION METHOD OF A MULTI-LAYER NEURAL NETWORK MODEL, APPARATUS AND STORAGE MEDIUM

(71) Applicant: CANON KABUSHIKI KAISHA, Tokyo (JP)

(72) Inventors: Wei Tao, Beijing (CN); Hongxing Gao, Beijing (CN); Tsewei Chen, Tokyo (JP); Dongchao Wen, Beijing (CN); Junjie Liu, Beijing (CN)

(73) Assignee: CANON KABUSHIKI KAISHA, Tokyo (JP)

( * ) Notice: Subject to any disclaimer, the term of this patent is extended or adjusted under 35 U.S.C. 154(b) by 653 days.

(21) Appl. No.: 16/721,606

(22) Filed: Dec. 19, 2019

(65) Prior Publication Data

US 2020/0210843 A1    Jul. 2, 2020

(30) Foreign Application Priority Data

Dec. 29, 2018   (CN) .......................... 201811633954.0

(51) Int. Cl.
  *G06N 20/00*   (2019.01)
  *G06N 3/084*   (2023.01)
  *G06N 3/04*    (2023.01)

(52) U.S. Cl.
  CPC ............... *G06N 3/084* (2013.01); *G06N 3/04* (2013.01)

(58) Field of Classification Search
  CPC .................................. G06N 3/084; G06N 3/04

USPC .......................................................... 706/25
See application file for complete search history.

(56) References Cited

U.S. PATENT DOCUMENTS

| | | | |
|---|---|---|---|
| 2016/0162782 A1 | 6/2016 | Park | |
| 2017/0032222 A1* | 2/2017 | Sharma | ................ G06V 10/449 |
| 2020/0167929 A1* | 5/2020 | Wang | ...................... G06T 7/194 |
| 2020/0167930 A1* | 5/2020 | Wang | ...................... G06T 7/11 |

FOREIGN PATENT DOCUMENTS

CN    107909008 A    4/2018

OTHER PUBLICATIONS

Zhezhi He, et al.; "Optimize Deep Convolutional Neural Network with Ternarized Weights and High Accuracy;" Department of Electrical and Computer Engineering, University of Central Florida, Orlando, 32816 USA; Jul. 20, 2018; pp. 1-8.

* cited by examiner

*Primary Examiner* — Tyler J Lee
*Assistant Examiner* — Tiffany P Ohman
(74) *Attorney, Agent, or Firm* — CANON U.S.A., INC. IP Division

(57) ABSTRACT

The present disclosure provides a training and application method of a multi-layer neural network model, apparatus and storage medium. A number of channels of a filter in at least one convolutional layer in the multi-layer neural network model is expanded, and a convolution computation is performed by using the filter after expanding the number of channels, so that the performance of the network model does not degrade while simplifying the network model.

10 Claims, 15 Drawing Sheets

TRAINING AND APPLICATION METHOD OF A MULTI-LAYER NEURAL NETWORK MODEL, APPARATUS AND STORAGE MEDIUM

BACKGROUND OF THE INVENTION

Field of the Invention

The present disclosure relates to a modeling field for a multi-layer neural network, and particularly to a method for simplifying the structure of a multi-layer neural network model and making the performance comparable to conventional technology.

Description of the Related Art

In recent years, modeling-based multi-layer neural network models have been widely used in computer services, such as image classification, target detection, and image segmentation. In order to improve service accuracy, the network models are designed to be deeper and deeper (more layers) and wider and wider (more output feature maps of each layer), for example, network models such as VGGNet, ResNet, and Xception. Since these network models have the disadvantages of large computation amount and slow processing speed, they are difficult to apply to resource-constrained devices, such as smart phones, robot devices and others. At present, there are several ways to simplify the structures of the network models and ensure the performance of the network models as follows.

1. Network Pruning. This method makes a weight of a filter sparse by setting a part of parameters in the filter to 0, or directly removes a part of filters to reduce the number of filters, thereby achieving the purpose of simplifying the network model. Although the network pruning can effectively simplify the network model, it is difficult to achieve accurate hyper-parameter setting to determine which filters in the convolutional layer can be removed, which makes the practical application of the network pruning limited.

2. Parameter Quantization. This method reduces the storage space of the network model and improves the computation speed by reducing the representation precision of the parameters in the filter. For example, the full precision represented by 32 bits is quantized to the binary precision represented by 1 bit. This method can reduce the storage space occupied by the network model, but the reduced representation precision of the parameters will make the performance of the network model worse.

3. Low-rank Approximate. This method decomposes filter parameters represented by a large-scale matrix into a plurality of matrix parameters represented by a small-scale matrix, thereby making the network model smaller. However, the compression ratio of this method is limited and does not bring about a significant reduction in the computation amount.

4. Efficient network design. By optimizing a convolution operator and designing a specific efficient network model, such as a local binary convolutional neural network (LB CNN) model or a bottleneck design, the purpose of simplifying the network model is achieved. Taking the LB CNN model as an example, one conventional convolution process is decomposed into two convolution processes, wherein for the first time, a sparse and fixed binary convolution filter is used for convolution, and for the second time, a (1×1) filter that is learnable and whose parameter scale is small, is used for convolution. The parameters in the binary convolution filter in the first convolution process are fixed, each layer in the network model can share one binary convolution filter, and the matrix scale of the filter in the second convolution process is small, so the storage space occupied by the network model becomes smaller as a whole. However, since the one conventional convolution process is decomposed into two convolution processes, the depth of the LB CNN is instead increased, which is disadvantageous to the convergence of the training process of the network model.

5. Ternarized Weights. By Residual Expansion technology, this method uses different thresholds α on a convolutional layer and a fully connected layer to introduce more filters, which effectively improves the accuracy of the network model. However, this may introduce more filters of ternarized weights in the network model, resulting in a significant increase in the size of the network model.

The methods described above have their own drawbacks and all are unable to achieve a better balance between simplifying the network model and maintaining the performance.

SUMMARY OF THE INVENTION

According to an aspect of the present disclosure, it is provided an application method of a multi-layer neural network model, comprising of: for at least one convolutional layer in the multi-layer neural network model, expanding the number of channels of a filter of the convolutional layer; performing data computation in the convolutional layer with the filter after channel number expansion based on data corresponding to an application requirement, during forward propagation; and outputting an application result after completing the forward propagation.

According to another aspect of the present disclosure, it is provided a training method for a multi-layer neural network model, comprising of: for at least one convolutional layer in the multi-layer neural network model to be trained, expanding the number of channels of a filter of the convolutional layer; performing data computation in the convolutional layer with a filter after channel number expansion based on data for training, during forward propagation; and updating a gradient value of a weight on a channel before channel number expansion according to gradient values of weights on identical channels in the channels after channel number expansion, to implement training on the network model, during back propagation; wherein the weights on the identical channels are derived from the weight where the gradient value is to be updated on the channel before channel number expansion.

According to another aspect of the present disclosure, it is provided an application method of a multi-layer neural network model, comprising of: for at least one convolutional layer, accumulating a plurality of input feature maps of the convolutional layer and performing a convolution computation in the convolutional layer by using the accumulated input feature map and filters in the convolutional layer, during forward propagation; and outputting an application result after completing the forward propagation.

According to another aspect of the present disclosure, it is provided an application apparatus of a multi-layer neural network model, comprising: an expansion unit configured to expand in advance the number of channels of a filter in at least one convolutional layer in the multi-layer neural network model; a forward propagation unit configured to perform data computation in the convolutional layer with the filter after channel number expansion based on data corresponding to an application requirement; and an output unit configured to output an application result after completing forward propagation.

According to another aspect of the present disclosure, it is provided a training apparatus for a multi-layer neural network model, comprising: an expansion unit configured to expand in advance the number of channels of a filter in at least one convolutional layer in the multi-layer neural network model to be trained; a forward propagation unit configured to perform data computation in the convolutional layer with the filter after channel number expansion based on data for training; and a back propagation unit configured to update a gradient value of a weight on a channel before channel number expansion according to gradient values of weights on identical channels in the channels after channel number expansion, to implement training on the network model, wherein the weight on the identical channels are derived from the weight where the gradient value is to be updated on the channel before channel number expansion.

According to another aspect of the present disclosure, it is provided an application apparatus of a multi-layer neural network model, comprising: an accumulating unit configured to accumulate, for at least one convolutional layer, a plurality of input feature maps of the convolutional layer during forward propagation; a computation unit configured to perform a convolution computation in the convolutional layer by using the accumulated input feature map and filters in the convolutional layer; and an output unit configured to output an application result after completing the forward propagation.

According to another aspect of the present disclosure, it is provided a non-transitory computer-readable storage medium storing instructions that, when executed by a computer, cause the computer to perform the above application method of the multi-layer neural network model.

According to another aspect of the present disclosure, it is provided a non-transitory computer-readable storage medium storing instructions that, when executed by a computer, cause the computer to perform the above training method of the multi-layer neural network model.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure, and together with the description of the embodiments, serve to explain the principles of the disclosure.

DESCRIPTION OF THE EMBODIMENTS

Figure 1:
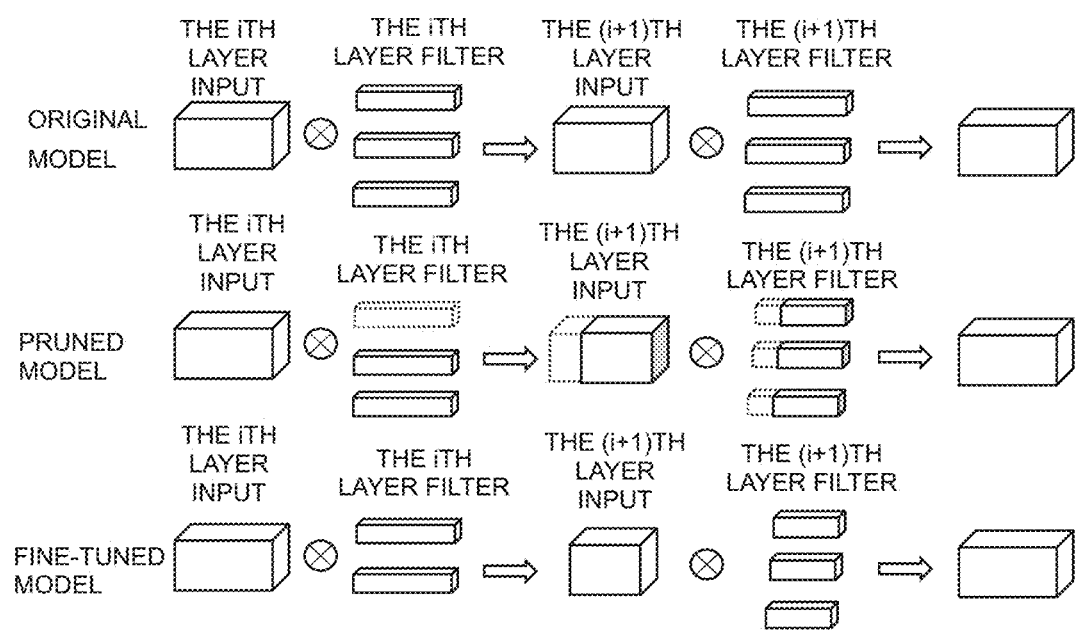
FIG. 1 shows a pruning and fine-tuning process of a pruning network model.

The structures of traditional multi-layer neural network models are mostly complicated. In order to simplify the model structures, the network pruning is an applicable method. FIG. 1 shows processing of an Original Model (a model that has not been simplified), a Pruned Model, and a Fine-tuned Model that fine-tunes the Pruned Model in a Forward Propagation process.

In the Original Model, it is assumed that the ith layer is provided with three filters, the input feature map of the ith layer is convoluted separately with the three filters, and then the convolution computation result is taken as the input feature map of the (i+1)th layer (i.e., the output feature map of the ith layer), and continues to be convoluted with filters of the (i+1)th layer to perform forward propagation.

In the Pruned Model, firstly, a filter (shown by the dotted line in the ith layer of filters) in the ith layer, whose contribution to the overall performance of the network model is small, is removed, and at the same time, the corresponding input feature map and filter channels (shown by the dotted line in the (i+1)th layer of input feature map and filters) of this filter in the (i+1)th layer are also removed together. In a convolution computation, the input feature map of the ith layer is convoluted with the remaining two filters of the ith layer, and the convolution computation result of the ith layer is used as the input feature map of the (i+1)th layer, and the convolution computation of the (i+1)th layer is continued, thereby performing forward propagation processing. The Fine-tuned Model is a fine-tuning of the Pruned Model, so that the performance of the Pruned Model is roughly equivalent to that of the Original Model.

Based on the above network pruning, the network model can be effectively simplified by removing unimportant filters, but it is the difficulty of the network pruning method to determine which filters in the network model can be removed. As an example, according to the contribution degree to the network model, the respective information entropy scores are calculated for the feature maps in the layers, and filters corresponding to feature maps whose scores are lower than a threshold <T> is taken as filters that can be removed; as another example, the calculated information entropy scores of the feature maps are arranged in a descending order, and at the same time, a fixed compression ratio is used, and only the filters corresponding to the front threshold <K> feature maps are retained, and other filters are used as filters that can be removed. However, in practical applications, the threshold <T> and the threshold <K> are difficult to be determined, resulting in limited practical applications of the network pruning.

Figure 2:
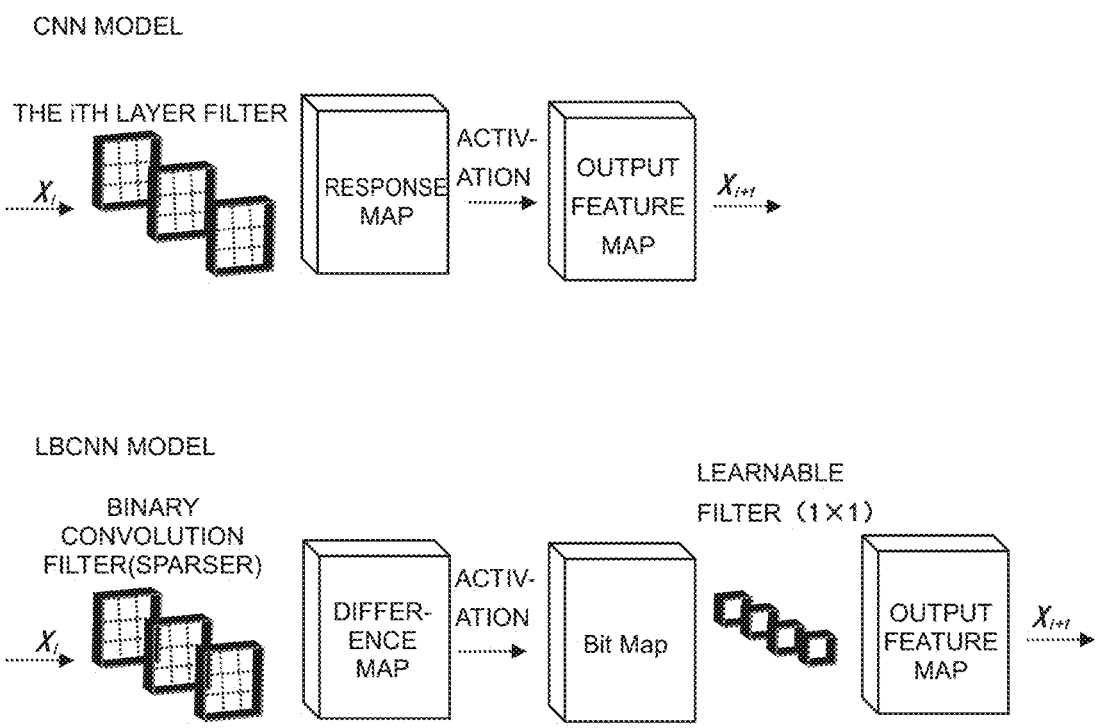
FIG. 2 shows forward propagation processes of a traditional convolutional neural network model and an LBCNN model.

Another commonly used optimization model is the LB CNN model. FIG. 2 shows, by taking the traditional convolutional neural network (CNN) model and the LB CNN model as examples, the forward propagation processes of the two network models.

The upper side of FIG. 2 is the forward propagation process of the traditional convolutional neural network (CNN) model. Assuming that the ith layer is provided with three filters having a scale of 3×3, an input feature map of the ith layer ($X_i$ on the upper left side of FIG. 2) is convoluted with the three filters to generate a Response Map, the elements in the response map is subjected to an activation computation to generate an output feature map ($X_{i+1}$ on the upper right side of FIG. 2), and the output feature map is output to the (i+1)th layer.

The lower side of FIG. 2 is the forward propagation process of the LB CNN model, which includes a set of binary convolution filters. The binary convolution filters have sparser matrix parameters relative to the filters in the CNN model on the upper side and are not updated during the network model training (the parameters are fixed). The LBCNN model also includes a nonlinear activation function and a set of learnable filters, the matrix parameters in the learnable filters having a small scale, for example 1×1. In the forward propagation process based on the LB CNN model, firstly, the input feature map of the ith layer ($X_i$ on the lower left side of FIG. 2) is convoluted with the binary convolution filters, and the computation result is activated by the nonlinear activation function. The activated Bit Map is convoluted with the learnable filters, and the output feature map ($X_{i+1}$ on the lower right side of FIG. 2) of the ith layer is finally generated and output to the (i+1)th layer.

Compared to the traditional CNN model, the binary convolution filters in the LBCNN model can be shared by a plurality of layers, and the important parameters are stored in a learnable filter with a small matrix parameter scale. Therefore, the size of the LBCNN model can be effectively reduced. However, there are two convolution processes in the LBCNN model, one of which is a convolution process for the sparse and fixed binary convolution filters, and the other of which is the convolution process for the learnable filters. Therefore, the depth of the LBCNN model is increased, and increasing the depth of the network model means that training of the network model becomes more difficult.

Figure 3A:
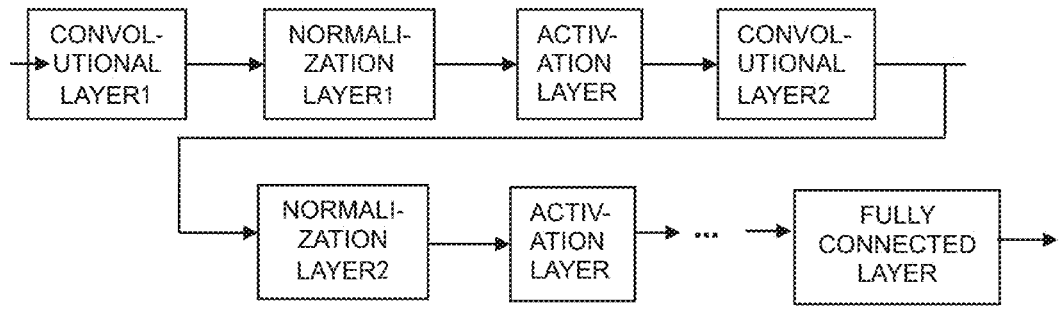
FIGS. 3(a) and 3(b) show a forward propagation process of an optimization method of ternarized weights and filter matrix parameters before and after quantization, respectively.
Figure 3A:
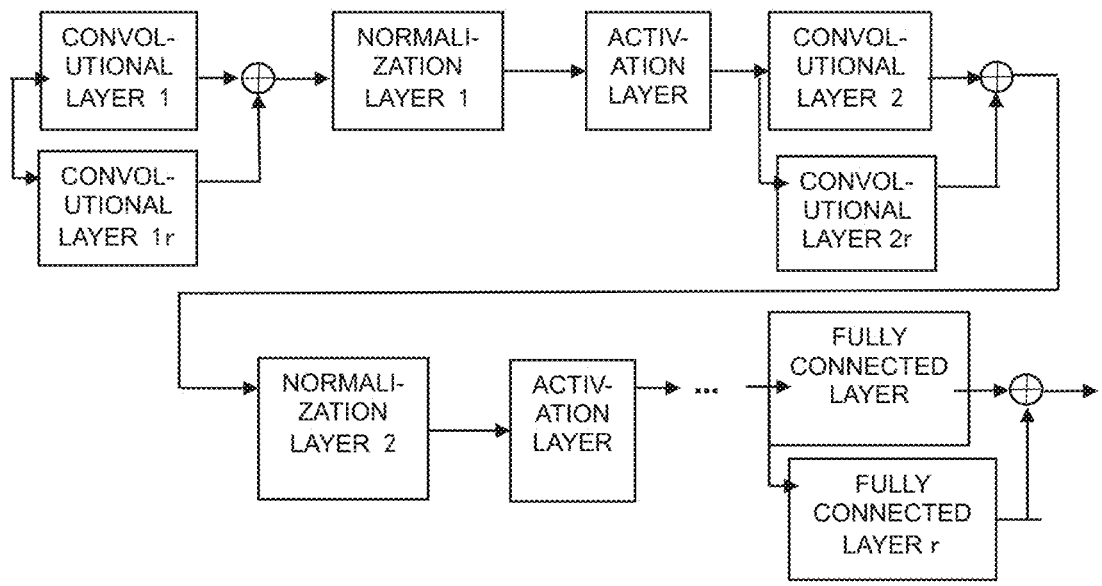

In addition to the LBCNN optimization model described above, FIG. 3(a) shows the network model optimized using the ternarized weights. The upper side of FIG. 3(a) is a conventional multi-layer convolutional neural network model, and the lower side is a network model with more filters introduced. Taking increasing the convolutional layer $1_r$ at a convolutional layer 1 as an example, firstly, two 2-bit precision filters are obtained by quantizing a full-precision 3×3 filter, and then filter matrix parameters as shown in 3(b) are obtained by adopting different thresholds α and $α_r$, respectively.

Figure 3B:
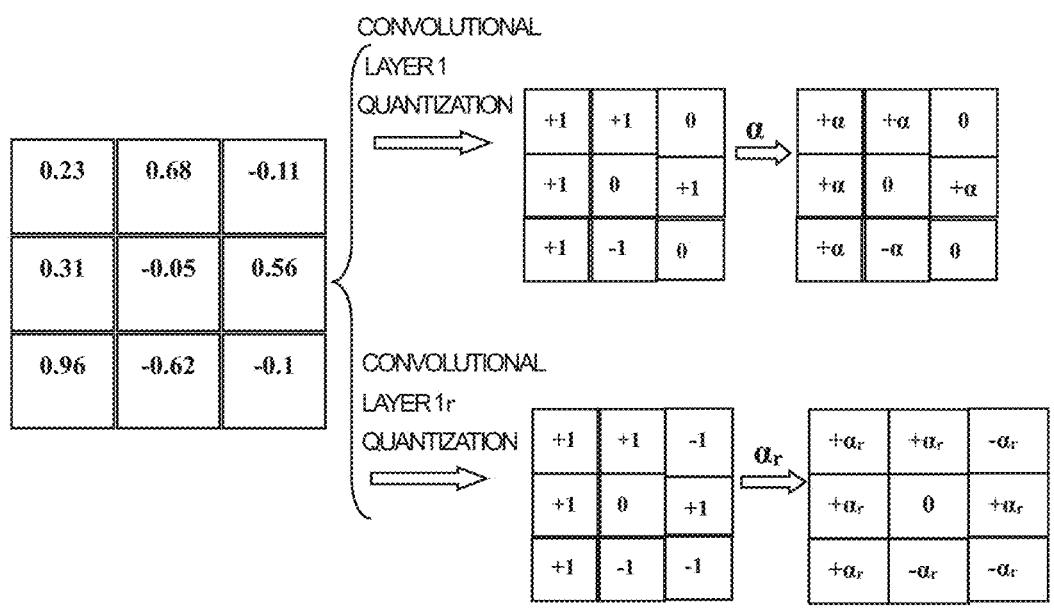

As can be seen from FIG. 3(a) and FIG. 3(b), the introduction of new filters can improve the accuracy of the neural network model, but the new filters multiplies the size of the network model, which makes simplification of the network model impossible to achieve.

In the current optimization processing of multi-layer neural network models, in order to simplify the size of the network model, situations such as that network performance degrades or that simplification is difficult to achieve are often caused. Based on this case, the present disclosure provides an optimization processing for a multi-layer neural network model. When training and applying a network model, the number of channels of a filter in at least one convolutional layer is expanded, a convolution computation is performed by using the filter with the expanded channel number, and the accuracy of the network model is ensured by the filter connection after the channel number is expanded, so as to ensure that the network performance does not degrade on the basis of simplifying the network model. Taking one convolutional layer in a multi-layer neural network model as an example, FIG. 4(a) describes the structure of the filters in the forward propagation and back propagation based on the ternarized weights, and FIG. 4(b) describes the structure of the filters in the forward propagation and back propagation based on the present disclosure. In the forward propagation of FIG. 4(a), all the filters ($W_1$ to $W_9$) in a certain convolutional layer are all stored in a storage area for storing the network model, and then nine filters ($W_1α$ to $W_9α$) based on a and nine filters ($W_1α_r$ to $W_9α_r$) based on a r are obtained by the residual expansion method and quantization described above, and convolution computations are performed using the eighteen filters. In the forward propagation shown in FIG. 4(b), the original c t channels in each template filter are expanded by three multiples, nine filters ($W''_1$ to $W''_9$) with the expanded channel number are obtained, and the channel number of each filter is $3c_r$. The template filter whose channel number is expanded is called a target filter, and the target filter is used to perform a convolution computation of this layer. FIG. 4(b) is described by taking nine filters as an example. To simplify the description, FIG. 4(c) shows a case where the channel number in one filter is expanded. In the forward propagation of FIG. 4(c), the filter $W_1$ is to be expanded by four multiples, and therefore, the channel number of $W_1$ is c'/4 before expansion.

Figure 4A:
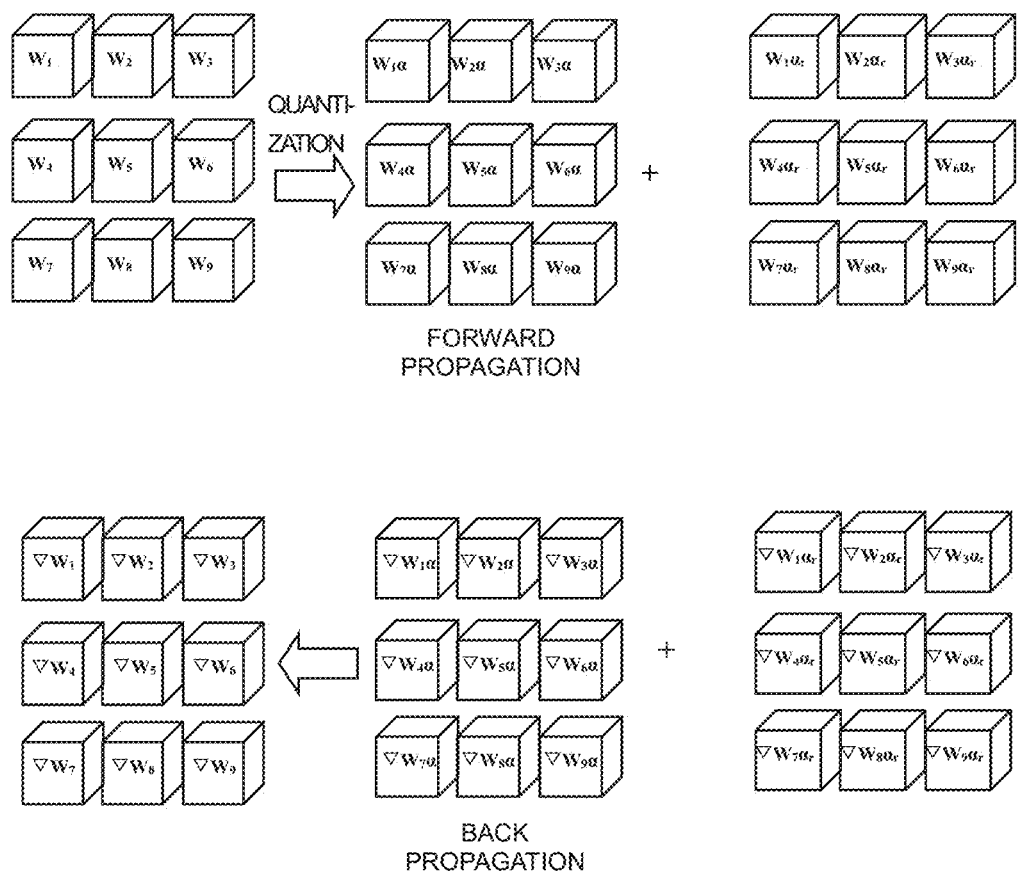
FIG. 4(a) shows the filter structure in the forward and back propagation in the ternarized weights.
Figure 4B:
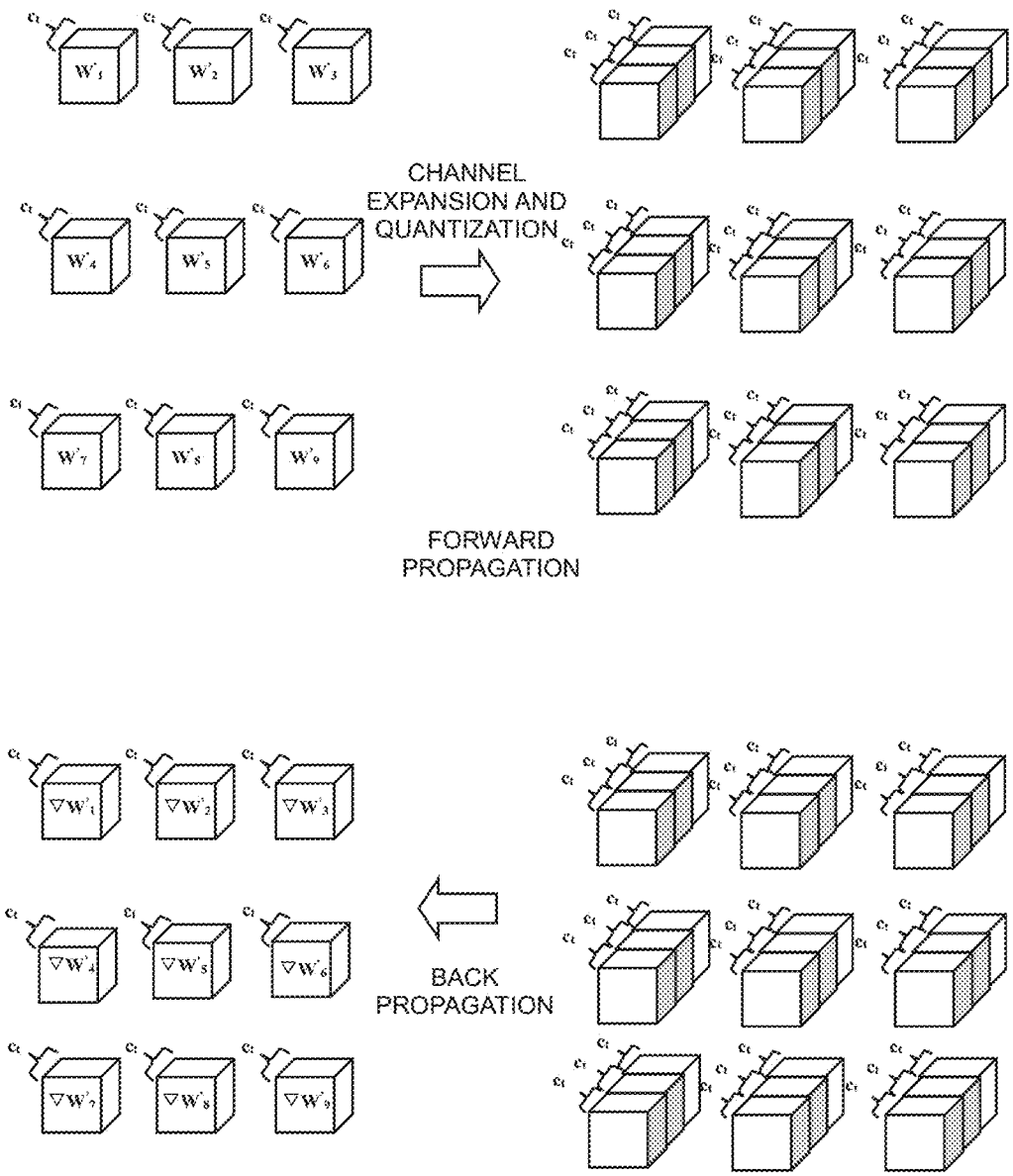
FIGS. 4(b) and 4(c) show the filter structure in the forward and back propagation in a method of the present disclosure.
Figure 4C:
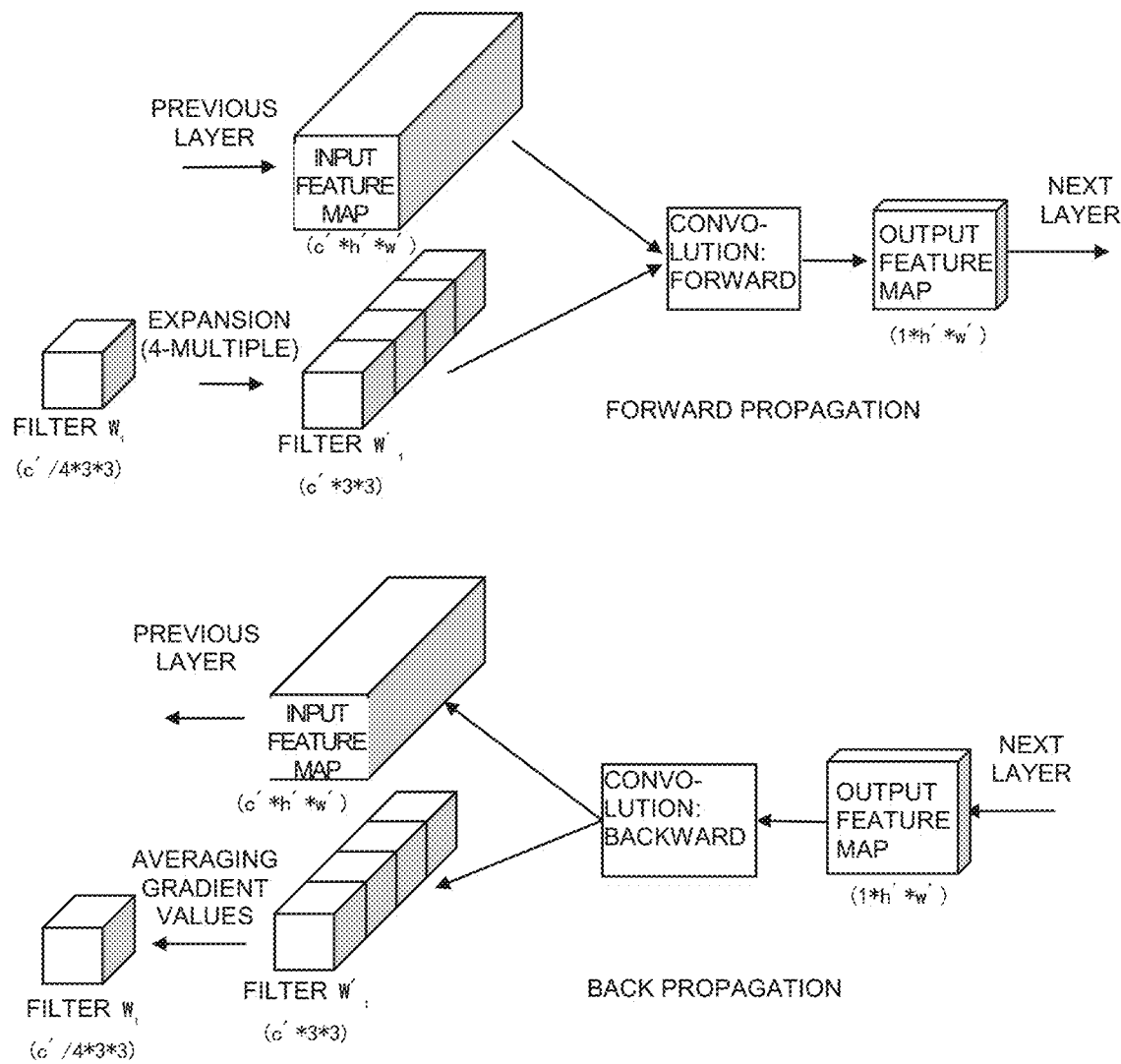

As can be seen from the comparison between FIG. 4(a) and FIG. 4(b), in the network model of the present disclosure, the weight connection in convolution is enriched by expanding the channel number of the filter, so that the performance of the network model does not decrease compared to the network model of the ternarized weights. Moreover, the framework of the network model can be simplified, since the filter whose channel number is smaller can be designed in the network model.

It should be noted that the template filter and the target filter described herein are filters for characterizing weight parameters in a multi-layer neural network model, and their computation methods and functions in the convolution computations are identical to those of conventional filters. The template filter and the target filter herein are used to distinguish the filter before expanding the channel number from the filter after expanding the channel number, and the functions and structures of the filters are not limited.

Various exemplary embodiments of the present disclosure will be described in detail below with reference to the drawings. It should be understood that the present disclosure is not limited to various exemplary embodiments described below. In addition, as a solution to the issue of the present disclosure, it is not necessary to include a combination of all the features described in all the exemplary embodiments.

Figure 5:
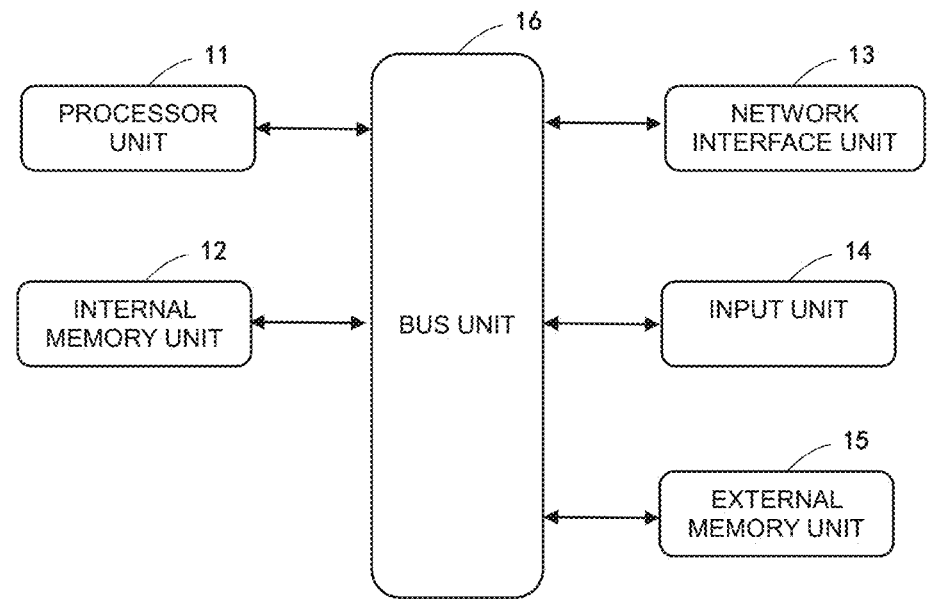
FIG. 5 shows a hardware environment of the present disclosure.

FIG. 5 shows a hardware environment for processing a multi-layer neural network model, which includes a processor unit 11, an internal memory unit 12, a network interface unit 13, an input unit 14, an external memory 15 and a bus unit 16.

The processor unit 11 may be a CPU or a GPU. The memory unit 12 includes a random access memory (RAM), a read only memory (ROM). The RAM can be used as a main memory, a work area and the like of the processor unit 11. The ROM can be used to store the control program of the processor unit 11, but can also be used to store files or other data to be used when the control program runs. The network interface unit 13 can be connected to a network and implement network communication. The input unit 14 controls input from devices such as a keyboard, a mouse, and the like. The external memory 15 stores a boot program, various applications, and the like. The bus unit 16 is used to connect the units in the optimization means of the multi-layer neural network model.

Figure 6:
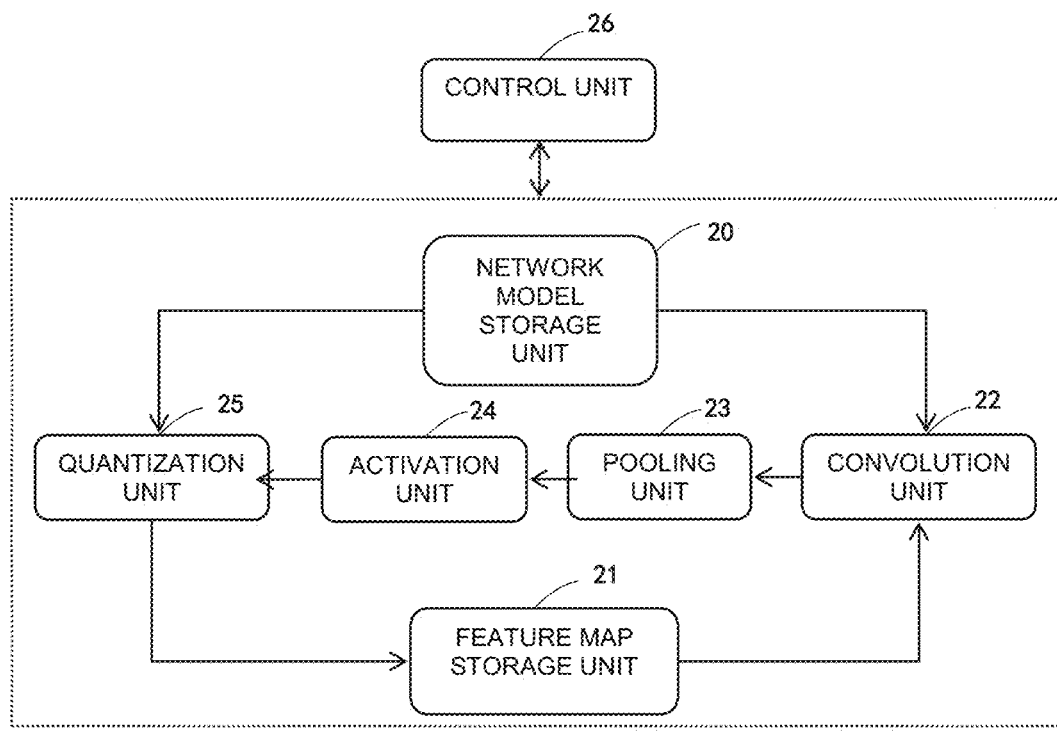
FIG. 6 shows a schematic diagram of an internal structure of a network model in the present disclosure.

FIG. 6 shows a schematic diagram of the internal structure of the network model in the present disclosure, and in the process of training and applying the network model, the network model can run based on the internal structure shown in FIG. 6. The structure includes a network model storage unit 20, a feature map storage unit 21, a convolution unit 22, a pooling unit 23, an activation unit 24, a quantization unit 25, and a control unit 26. Each unit will be described below.

The network model storage unit 20 stores information related to the multi-layer neural network model, including but not limited to network structure information, filter information required for the convolution computation, and information required for performing computation in other layers, which may additionally include information related to the expansion of the channel numbers of the filters, such as in which convolutional layers the channel numbers of filters are to be expanded, expansion coefficients of the channel numbers of filters, expansion manner, and the like. The feature map storage unit 21 stores feature map information required at the time of performing computation of the network model.

The convolution unit 22 is used to perform convolution processing based on the filter information input by the network model storage unit 20 and the feature map information input by the feature map storage unit 21. If it is necessary to expand the channel number of a filter, the convolution unit 22 can also perform expansion based on information stored in the network model storage unit 20 related to the expansion of the channel number of the filter.

The pooling unit 23, the activation unit 24, and the quantization unit herein are units for performing corresponding pooling processing, activation processing, and quantization processing, and their functions are not described again. Note that FIG. 6 is an example where a pooling layer and a quantization layer are included in the multi-layer neural network model, and the present disclosure is not limited to other cases. For example, in a case where only the convolutional layer and the quantization layer are included in the multi-layer neural network model, the output result of the convolution unit 22 can be directly passed to the quantization unit 25. In addition, the pooling unit 23, the activation unit 24, and the quantization unit 25 are exemplarily shown in the structure shown in FIG. 6, and other units such as a unit capable of performing regularization processing and a unit capable of scaling processing, which may be included, are omitted. It will not be repeated here.

The control unit 26 controls the running of the network model storage unit 20 to the quantization unit 25 by outputting control signals to other units in FIG. 6.

Hereinafter, various embodiments of the present disclosure will be described in detail with reference to the accompanying drawings.

First Exemplary Embodiment

Figure 7:
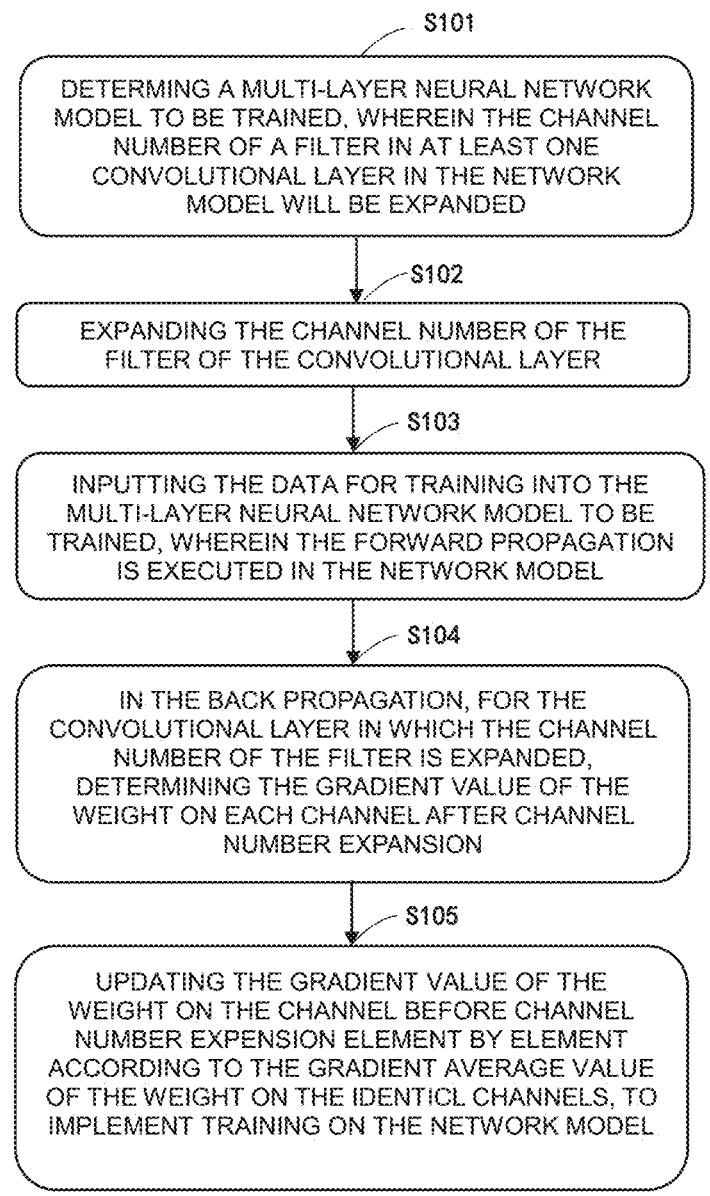
FIG. 7 shows a flow schematic diagram of a training method of a first exemplary embodiment of the present disclosure.

FIG. 7 describes a flow schematic diagram of steps of a training method for a multi-layer neural network model of the first exemplary embodiment of the present disclosure. In the present exemplary embodiment, the training flow of the multi-layer neural network model shown in FIG. 6 is implemented by using the RAM as a work memory and causing the GPU/CPU 11 to execute a program (such as a neural network forward/back propagation algorithm, etc.) stored in the ROM and/or the external memory 15.

Step S101: Determining a multi-layer neural network model to be trained, wherein the channel number of a filter in at least one convolutional layer in the network model will be expanded.

In the present embodiment, information of at least one network model may be stored in the network model storage unit 20 shown in FIG. 6, and feature map information used when the network model runs is stored in the feature map storage unit 21. When the training is triggered (such as receiving a training request or the training trigger time arriving, etc.), the step S101 is started.

Step S102: Expanding, for the at least one convolutional layer in the multi-layer neural network model to be trained, the number of channels of a filter of the layer to obtain a filter with the expanded channel number.

In this step S102, the filter before expanding the channel number may be referred to as a template filter, and the filter after expanding the channel number may be referred to as a target filter.

In this step S102, the expansion of the channel number of a filter can be performed based on the information related to the expansion of the channel numbers of filters stored in the network model storage unit 20 shown in FIG. 6. Here, the expansion of the channel numbers of filters refers to many times reproductions of the filter channels. In other words, when one channel is expanded into a plurality of channels, the plurality of channels after expansion are the same as the channel before expansion, that is, the weight on the channel before expansion is the same as the weight on the channels after expansion. For example, before the channel number is expanded, the filter $W_1$ has a channel $C_{1-1}$, a channel $C_{2-1}$, and a channel $C_{3-1}$. When the channel number is expanded, the three channels are each replicated twice to obtain new channels $C_{1-2}$ and channel $C_{1-3}$, channel $C_{2-2}$ and channel $C_{2-3}$, and channel $C_{3-2}$ and channel $C_{3-3}$. After the channel number is expanded, the channels $C_{1-1}$ to $C_{1-3}$ are the identical channels, and the weight on the channels is derived from the weight of the channel $C_{1-1}$ before the expansion; similarly, the channels $C_{2-1}$ to $C_{2-3}$ are the identical channels, and the weight on the channels is derived from the weight of the channel $C_{2-1}$ before the expansion; the channels $C_{3-1}$ to $C_{3-3}$ are the identical channels, and the weight on the channels is derived from the weight of the channel $C_{3-1}$ before the expansion. A specific process of expanding the channel number of a filter will be described later, and will not be described here.

The above steps S101 to S102 are pre-processing executed for performing training on the network model in the embodiment, by which the channel number of a filter of at least one layer in the network model is expanded, so that in the subsequent forward propagation and back propagation, the convolution computation can be performed by using the filter with the expanded channel number.

Step S103: Inputting the data for training into the multi-layer neural network model to be trained, wherein the forward propagation is performed in the network model.

In this step S103, the data for training is subjected to corresponding computation or processing layer by layer in the multi-layer neural network. In the convolutional layer in which the channel number of the filter is expanded, the input feature map of the convolutional layer is convoluted with the filter having expanded channels.

Here, the data for training may be, for example, a set of pictures and corresponding description data, or a set of voices and corresponding description data, etc., and the embodiment does not limit the type of data. The data used when performing processing such as image processing and voice processing in the multi-layer neural network model can be applied to the training method of the first embodiment.

Step S104: In the back propagation, determining, for the convolutional layer in which the channel number of the filter is expanded, the gradient value of the weight on each channel after the channel number is expanded.

Step S105: Updating the gradient value of the weight on the channel before expanding the channel number according to the gradient values of the weights on the identical channels determined in step S104, so as to implement training on the network model.

Here, the identical channels refer to a channel that is expanded from the same channel before expansion. For example, in the step S102, the three channels $C_{1-1}$ to $C_{3-1}$ of the filter $W_1$ are expanded to obtain nine channels $C_{1-1}$ to $C_{3-3}$. In the back propagation, firstly, the gradient values of the weight elements on nine channels $C_{1-1}$ to $C_{3-3}$ are calculated separately. Then, the gradient values of the weights on the channels before the expansion are updated by using the gradient values of the weights on the identical channels.

Here, the reason for performing the above-described gradient value processing on the weights on the channel is that, in the forward propagation, the input feature maps are separately convoluted with the filters having expanded channels, and therefore, in the back propagation, if the gradient values of the weights on the expanded channels are directly calculated in a known manner, that is, these weights are derived from the same weight before expansion, the gradient values of these weights are different, which destroys the structure of the channel expansion. Therefore, by the processing of updating the gradient values of the weights on the channels before expansion in step S105 of the present embodiment, the destruction of the channel structure can be avoided.

Of course, if the expansion of the channel numbers of filters is not performed in the convolutional layer, the processing in step S105 need not be performed, and after the gradient value of the weight element in each channel of the filter may be calculated according to a known manner, the update of the weights of the filters is completed (i.e., the training of the network model is achieved).

A specific implementation manner of the first embodiment of training the network model of the present disclosure is described in detail below.

<Expansion of Channel Number of Filter>

Here, a case where the expansion of the channel number is achieved by replicating the channels of the template filter is described as an example. Assuming that a certain convolutional layer is provided with 9 template filters, each of which has a height (row) h=3, a width (column) w=3, and a channel number c=16. The channel number is to be replicated by 3 multiples, that is, the channel number of the filters after replication is C=48, and the height/width of the filters after channel replication is the same as the height/width of the filters before replication. Of course, the height/width of the template filter can also be different between before replication and after replication. For example, when replicating a channel, the row of the channel is replicated so that the height of the filter after channel replication is greater than the height of the filter before replication, and the column of the channel is replicated so that the width of the filter after channel replication is greater than the width of the filter before replication. In addition, the plurality of the channels to be replicated may be preset according to the actual needs or experimental effects, and the present disclosure is not limited thereto.

Figure 8:
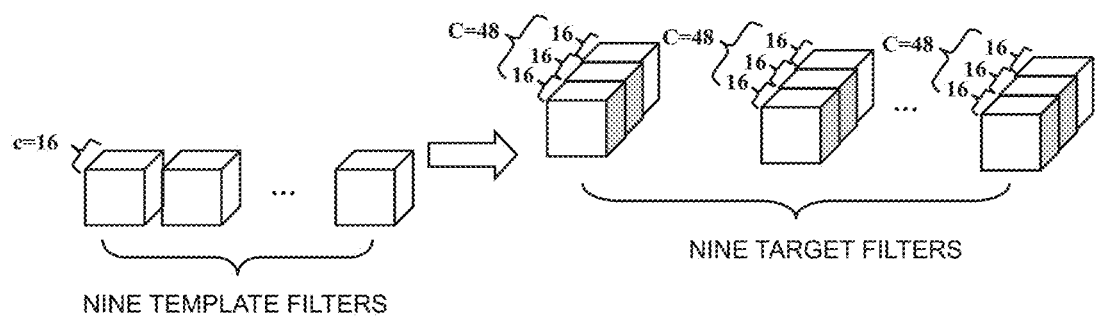
FIGS. 8 and 9 each show schematic diagrams of the expansion of the number of channels of a filter of the first exemplary embodiment of the present disclosure.

In order to expand the channel number of the filters from 16 to 48, the channel of each filter can be replicated as a whole. Referring to FIG. 8, for example, the row/column of a template filter is maintained unchanged, the 16 channels of the template filter are replicated twice as a whole (i.e., expansion of three multiples), and a target filter including 48 channels is constructed. As can be seen from FIG. 8, since it is an overall replication of the channel, the first 16 channels, the middle 16 channels, and the last 16 channels are the same for any target filter obtained after replication.

FIG. 8 shows a case where the channel number after expansion is an integer multiple of the channel number before expansion. If the channel number after expansion is not an integer multiple of the channel number before expansion, the channel replication process can be decomposed into a channel overall replication and a channel individual replication so that the channel number after replication meets the requirements. Taking the case shown in FIG. 9 as an example, it is assumed as shown in FIG. 8 that nine template filters are provided in the convolutional layer, and each template filter has a height (row) h=3, a width (column) w=3 and the channel number c=16, and the channel number after expansion is C=42. At this time, the channel number after expansion is 10 more than twice of the channel number before expansion. Firstly, the 16 channels of the template filter are replicated one multiple as a whole, and then the first 10 channels of the 16 channels of the template filter are replicated again, and a target filter having 42 channels is constructed. Here, the target filter can be constructed by replicating the first channels of the template filter, or the last 10 channels of the template filter, or 10 channels at other positions, which are not limited in this embodiment, as long as each template filter uses the same replication principle.

<Forward Propagation>

After the channel number of the filter is expanded by the above method, the convolution computation is performed by the filter having expanded channels in the forward propagation process. Taking the case shown in FIG. 10 as an example, it is assumed that the ith layer convolutional layer has two template filters $W_1$ and $W_2$, each having a channel number of 16. In the preprocessing of the expansion of the channel numbers of the filters, the channel numbers of $W_1$ and $W_2$ are replicated twice (expansion of three multiples) in the manner shown in FIG. 8, and the target filters $W'_1$ and $W'_2$ including 48 channels are generated. The channels of $W'_1$ are separately represented by $C_{1-1}$ (corresponding to the original 16 channels before replication), $C_{1-2}$ (corresponding to 16 channels obtained by the first replication), and $C_{1-3}$ (corresponding to 16 channels obtained by the second replication). Similarly, the channels of $W'_2$ is represented by $W_{2-1} \sim W_{2-3}$ (not shown in FIG. 10). The 48 input feature maps of the ith layer are convoluted with the target filters $W'_1$ and $W'_2$ to generate two output feature maps. The convolution computation here is the same as the traditional convolution computation, and will not be described here.

<Back Propagation>

In the solution of the first embodiment, the channel numbers of the filters in at least one convolutional layer in the network model are expanded. Therefore, in the back propagation, in order to ensure the inherent structure of the channel expansion, the gradient value of each weight in the channel is calculated before expansion. An optional implementation manner is: determining, according to the gradient value of the output feature map transmitted from the next layer, the gradient value of the weight of the filter after the channel number in the present layer is expanded, and further calculating the arithmetic mean corresponding to the gradient values on the identical channels weight by weight, as the gradient value of the corresponding weight on the channel before expansion. In the foregoing step S105, the process of updating the gradient value of the weight on the channel before expansion has been described by taking the case shown in FIG. 10 as an example. More specifically, taking the channel $C_{1-1}$ to the channel $C_{1-3}$ as an example, the gradient values of the weights at the (0, 0) position on the channel $C_{1-1}$ to the channel $C_{1-3}$ are averaged, and the average value is used as the gradient value of the weight at the (0, 0) position on the channel $C_{1-1}$ before expansion. By analogy, until the gradient values of the weights at all positions on the channel $C_{1-1}$ are updated, the update of the gradient values of the weights of the channel before expansion is completed.

Specifically, the above method of averaging the gradient values to calculate the gradient values of the weights on the channel before expansion can be expressed by Formula (1).

$$AvgGrad_{(n,c,h,w)} = \frac{\sum_{1}^{r} Grad_{(n,c',h,w)}}{r} \quad \text{Formula (1)}$$

Where n is the number of filters, c is the channel number of the template filter, h and w are the spatial positions of the weight elements in the filter, c' is the channel number of the filter after expansion, and r is the number of the identical channels after expansion; $Grad_{(n,c',h,w)}$ is the gradient value of the weight at the (h, w) position on one channel of the identical channels; $AvgGrad_{(n,c,h,w)}$ is the element gradient value of the weights at the (h, w) position on the updated channel before expansion.

With the training method described in the first exemplary embodiment of the present disclosure, even if a filter having a smaller channel number is designed, by expanding the channel number and enriching the weight connection, the performance of network model is not degraded while simplifying the network model result.

It should be noted that, in the training manner of the first exemplary embodiment, the gradient value of the weight on the channel before expanding the filter is updated, that is, the weight on the channel before expansion is trained. After training the weight on the channel before expansion is completed, in order to save storage space, the channel information of the expanded new channel stored in the temporary storage area can be released, so that the network model is kept in a simplified state. The first embodiment is not limited to other modifications to the training process. For example, in back propagation, after calculating the average gradient value of the weights on the identical channels after expansion, the gradient value of the weight on the channel before expansion is not calculated, that is, the weight of the channel after expansion is trained. In the future network model application, the corresponding application service can be executed by directly using the trained weights on the channel after expansion.

Second Exemplary Embodiment

Figure 11:
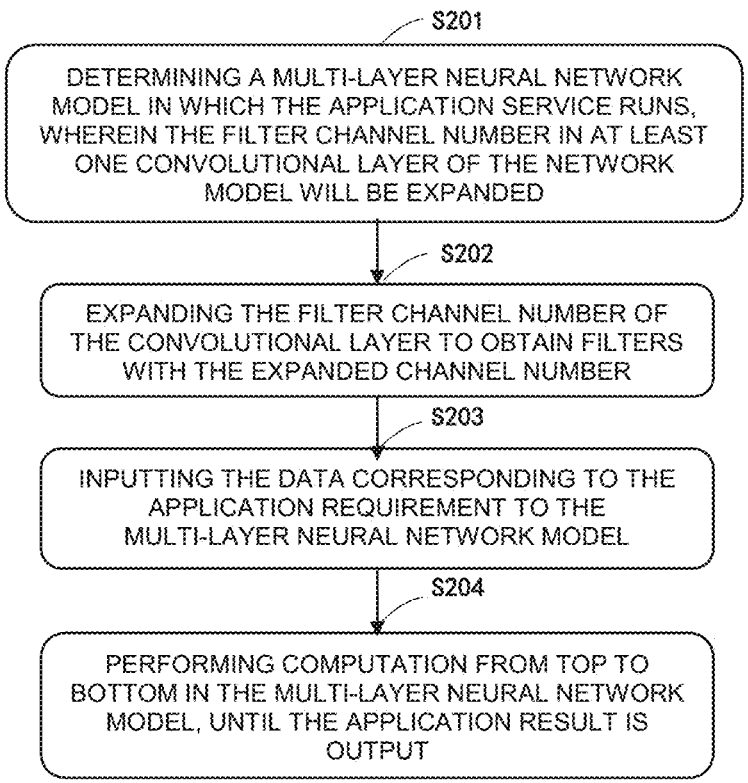
FIG. 11 is a flow schematic diagram of an application method of a second exemplary embodiment of the present disclosure.

After implementing the training of the network model based on the first exemplary embodiment, the second embodiment describes a method of applying the trained network model. FIG. 11 describes a flow schematic diagram of an application method of the second exemplary embodiment. In the second exemplary embodiment, the processing flow of the multi-layer neural network model shown in FIG. 11 is implemented by using the RAM as a work memory and causing the GPU/CPU 11 to execute a program (such as an application algorithm or the like) stored in the ROM and/or the external memory 15.

Step S201: Determining a multi-layer neural network model in which the application service runs, wherein the channel number of a filter in at least one convolutional layer of the network model will be expanded.

Step S202: Expanding the channel number of the filter of the convolutional layer to obtain a filter with the expanded channel number.

The above steps S201 and S202 are preprocessing steps similar to those of the first exemplary embodiment. Here, the expansion of the channel number of the filter is the same as that of the first exemplary embodiment, and details are not described herein again.

Step S203: Inputting the data corresponding to an application request to the multi-layer neural network model.

In this step S203, taking the face detection service as an example, a face image is input as data of the face detection application into the multi-layer neural network model, so as to execute the face detection service in the network model.

Step S204: Performing the computation from top to bottom in the multi-layer neural network model, until the application result is output.

The application method of the above steps S201 to S204 is based on the case of training the channel before expansion in the first exemplary embodiment. If the channel after expansion is trained in the first exemplary embodiment, in the application method of the second embodiment, the preprocessing for the channel number expansion of the filter of step S201 and step S202 is not necessary to be performed, and the forward propagation is directly performed.

Hereafter, taking the baseline network model as an example, the performance of the network model and the size of the network model will be compared between the traditional baseline network model (without channel expansion), and 4-multiple channel expansion and 8-multiple channel expansion based on the first exemplary embodiment of the present disclosure.

Table 1 is an example of a baseline network model designed to perform object detection tasks, and the network model shown in Table 1 is a traditional baseline model that does not use the method of the present disclosure. For ease of understanding, the network model in Table 1 only shows convolutional layer 1 to convolutional layer 8, and other convolutional layers that may be included in the network model or layers such as a pooling layer, a quantization layer, and a normalization layer are not shown. However, it does not affect the understanding of the baseline network model.

TABLE 1

| Network layer | Number of filters | Channel number of filter | Size of filter |
|---|---|---|---|
| Convolutional layer 1 | 16 | 3 | 3 * 3 |
| Convolutional layer 2 | 32 | 16 | 3 * 3 |
| Convolutional layer 3 | 64 | 32 | 3 * 3 |
| Convolutional layer 4 | 128 | 64 | 3 * 3 |
| Convolutional layer 5 | 256 | 128 | 3 * 3 |
| Convolutional layer 6 | 512 | 256 | 3 * 3 |
| Convolutional layer 7 | 1024 | 512 | 3 * 3 |
| Convolutional layer 8 | 1024 | 1024 | 3 * 3 |

In the scheme of 4-multiple channel expansion of the first exemplary embodiment of the present disclosure, referring to Table 2, the adopted structure of the network model is similar to that shown in Table 1, except that the channel numbers of the filters (i.e., the template filter in the first exemplary embodiment of the present disclosure) of convolutional layer 5 to convolutional layer 8 are 32, 64, 128, and 256, respectively. Similarly, in the scheme of 8-multiple channel expansion, referring Table 3, the channel numbers of the filters of convolutional layer 5 to convolutional layer 8 are 16, 32, 64, and 128, respectively.

TABLE 2

| Network layer | Number of filters | Channel number of filter | Size of filter |
|---|---|---|---|
| Convolutional layer 1 | 16 | 3 | 3 * 3 |
| Convolutional layer 2 | 32 | 16 | 3 * 3 |
| Convolutional layer 3 | 64 | 32 | 3 * 3 |
| Convolutional layer 4 | 128 | 64 | 3 * 3 |
| Convolutional layer 5 | 256 | 32 | 3 * 3 |
| Convolutional layer 6 | 512 | 64 | 3 * 3 |
| Convolutional layer 7 | 1024 | 128 | 3 * 3 |
| Convolutional layer 8 | 1024 | 256 | 3 * 3 |

TABLE 3

| Network layer | Number of filters | Channel number of filter | Size of filter |
|---|---|---|---|
| Convolutional layer 1 | 16 | 3 | 3 * 3 |
| Convolutional layer 2 | 32 | 16 | 3 * 3 |
| Convolutional layer 3 | 64 | 32 | 3 * 3 |
| Convolutional layer 4 | 128 | 64 | 3 * 3 |
| Convolutional layer 5 | 256 | 16 | 3 * 3 |
| Convolutional layer 6 | 512 | 32 | 3 * 3 |
| Convolutional layer 7 | 1024 | 64 | 3 * 3 |
| Convolutional layer 8 | 1024 | 128 | 3 * 3 |

When performing forward propagation of face detection using the three network models shown in Tables 1 to 3 described above, respectively, 4-multiple channel expansion is performed on convolutional layer 5 to convolutional layer 8 of the network model shown in Table 2, and 8-multiple channel expansion is performed on the network model shown in Table 3. Table 4 shows a structural description of the network models based on the baseline network model shown in Table 1 and after 4-multiple channel expansion based on the network model shown in Table 2, and after 8-multiple channel expansion based on the network model shown in Table 3.

TABLE 4

| Network model name | Structure description |
|---|---|
| Baseline | See table 1 |
| 4-multiple channel expansion | Similar to the structure of the baseline network model of Table 1, the difference is that from convolutional layer 5 to convolutional layer 8, a matrix expansion method is used to expand the channel number by 4 multiples (replication 3 times) |
| 8-multiple channel expansion | Similar to the structure of the baseline network model of Table 1, the difference is that from convolutional layer 5 to convolutional layer 8, the matrix expansion method is used to expand the channel number by 8 multiples (replication 7 times) |

Based on the three network models shown in Table 4, after the face detection is performed, the comparison result of the face detection rates shown in Table 5 and the comparison result of the storage sizes shown in Table 6 are obtained.

TABLE 5

| Baseline | 4-multiple channel expansion | 8-multiple channel expansion |
| --- | --- | --- |
| 0.8699 | 0.8598 | 0.8559 |

TABLE 6

| Network layer | Baseline | 4-multiple channel expansion | 8-multiple channel expansion |
| --- | --- | --- | --- |
| Convolutional layer 5 | 256*128*3*3 | 256*32*3*3 | 256*16*3*3 |
| Convolutional layer 6 | 512*256*3*3 | 512*64*3*3 | 512*32*3*3 |
| Convolutional layer 7 | 1024*512*3*3 | 1024*128*3*3 | 1024*64*3*3 |
| Convolutional layer 8 | 1024*1024*3*3 | 1024*256*3*3 | 1024*128*3*3 |
| Overall size of the channel (bytes) | 1,953,792 = 1.95M | 488,448 = 488K | 244,224 = 244K |

On the one hand, as can be seen from Table 6, in the channel expansion-based network model of the first exemplary embodiment of the present disclosure, the channel numbers from convolutional layer 5 to convolutional layer 8 significantly reduce, compared to the channel sizes of the traditional baseline model, and especially as the plurality of the channel expansion is higher, the channel number is fewer. On the other hand, as can be seen from Table 5, when face detection is performed using the channel expansion-based network model of the first exemplary embodiment of the present disclosure, the detection performance is substantially equivalent to the traditional baseline model.

Figure 12:
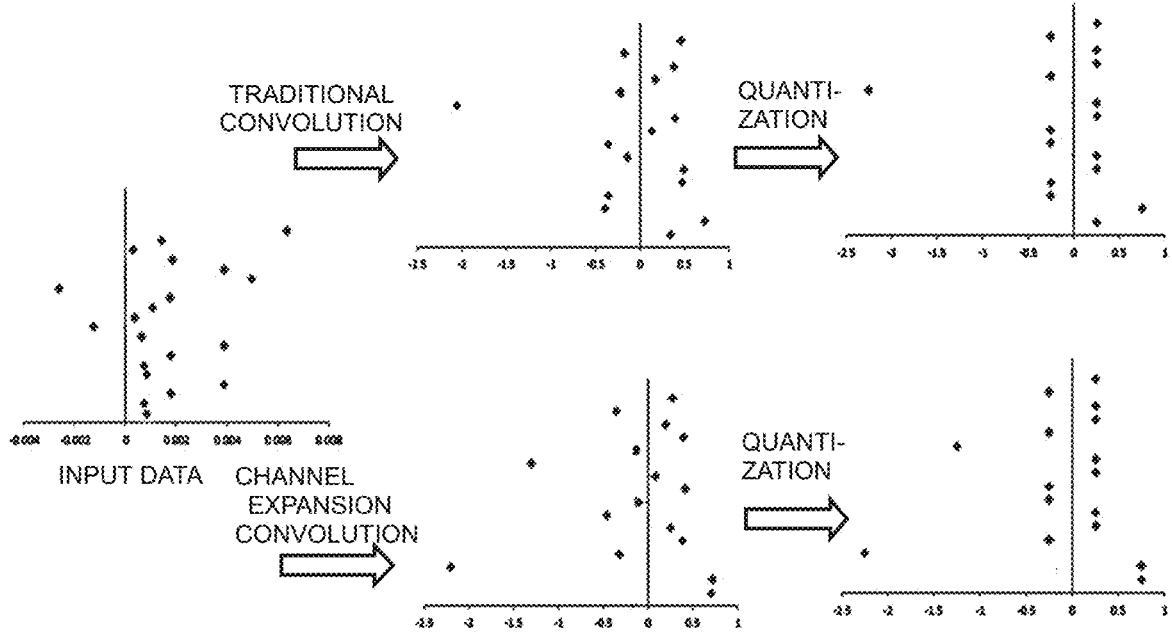
FIG. 12 shows a schematic diagram of feature distributions of input feature maps.

FIG. 12 shows a schematic diagram of the feature distribution of an input feature map in a traditional network model (without channel expansion) and a channel expansion network model of the first exemplary embodiment of the present disclosure. As can be seen from FIG. 12, after the convolution and quantization, the distributions of the input feature maps in the two network models is close to each other, which indicates that the network model of the first exemplary embodiment of the present disclosure and the traditional network model have equivalent performance in the service processing.

Third Exemplary Embodiment

Figure 13:
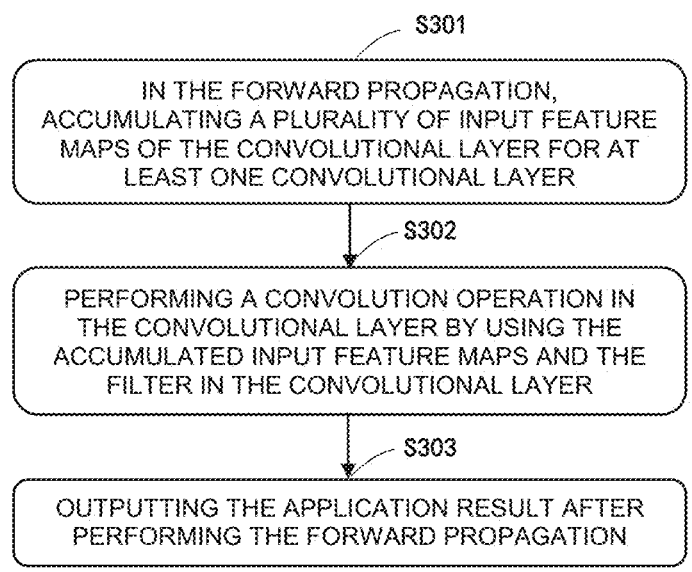
FIG. 13 is a flow schematic diagram of an application method of a third exemplary embodiment of the present disclosure.

The third exemplary embodiment of the present disclosure describes an application method of a multi-layer application network model implemented by accumulating an input feature map of a convolutional layer, and the application method of the third embodiment may be a training method of the network model obtained by training based on the training method of the first embodiment, but does not exclude the application of the network model obtained by other methods. FIG. 13 describes is a flow schematic diagram showing steps of the application method of the third embodiment. In the third exemplary embodiment, the processing flow of the multi-layer neural network model shown in FIG. 13 is implemented by using the RAM as a work memory and causing the GPU/CPU 11 to execute a program (such as an application algorithm or the like) stored in the ROM and/or the external memory 15.

Step S301: In the forward propagation, accumulating a plurality of input feature maps of at least one convolutional layer for the convolutional layer.

Step S302: Performing a convolution computation in the convolutional layer by using the accumulated input feature map and the filter in the convolutional layer.

Step S303: Outputting the application result after performing the forward propagation.

In the solution of the third embodiment, if the number of input feature maps of the convolutional layer is more than the channel number of the filter, a feasible manner is to expand the channel number of the filter according to the manner of the second embodiment, so that the input feature map is convoluted with the filter whose channel number is expanded; another feasible manner is to accumulate a larger number of input feature maps into a smaller number of input feature maps according to the manner of the third embodiment, so that the number of the input feature maps after the accumulation is matched with the channel number of the filter, and the convolution computation is performed by using the accumulated input feature map and the filter whose channel number is not expanded; the third feasible manner is, on the one hand, to expand the channel number of filter, if the multiple of the expansion is small and the expanded channel number is still less than the number of input feature maps, the input feature maps can be accumulated, and the convolution computation is performed by using the accumulated input feature map and the filter with the expanded channel number.

In the solution of the third embodiment, an optional manner of accumulating the input feature maps is as follows:

Step 1: Grouping a plurality of input feature maps of a convolutional layer.

When grouping, if the number of input feature maps is an integer multiple of the channel number of a filter, the number of input feature maps for each group after grouping is equal to the channel number of the filter. If the number of input feature maps is not an integer multiple of the channel number of the filter, the plurality of input feature maps are divided into two parts. The number of input feature maps of the first part is an integer multiple of the channel number of the filter, the input feature maps of the first part are grouped, and the number of input feature maps for each group is equal to the channel number of the filter. The number of input feature maps of the second part is smaller than the channel number of the filter, and the input feature maps of the second part is used as one group. Taking the number of input feature maps (for example, 48) being an integer multiple of the channel number (for example, 16) of the filter as an example, the input feature maps are divided into three groups in the order of positions, and there are 16 input feature maps in each group. Furthermore, taking the number of input feature maps (for example, 42) being not an integer multiple of the channel number (for example, 16) of the filter as an example, the input feature maps are divided into three groups in the order of positions, there are 16 input feature maps in the first group and the second group, and there are 10 input feature maps in the third group.

Step 2: Accumulating the input feature maps in each group to obtain accumulated input feature maps whose number is equal to that of the channel number of the filter.

Figure 14:
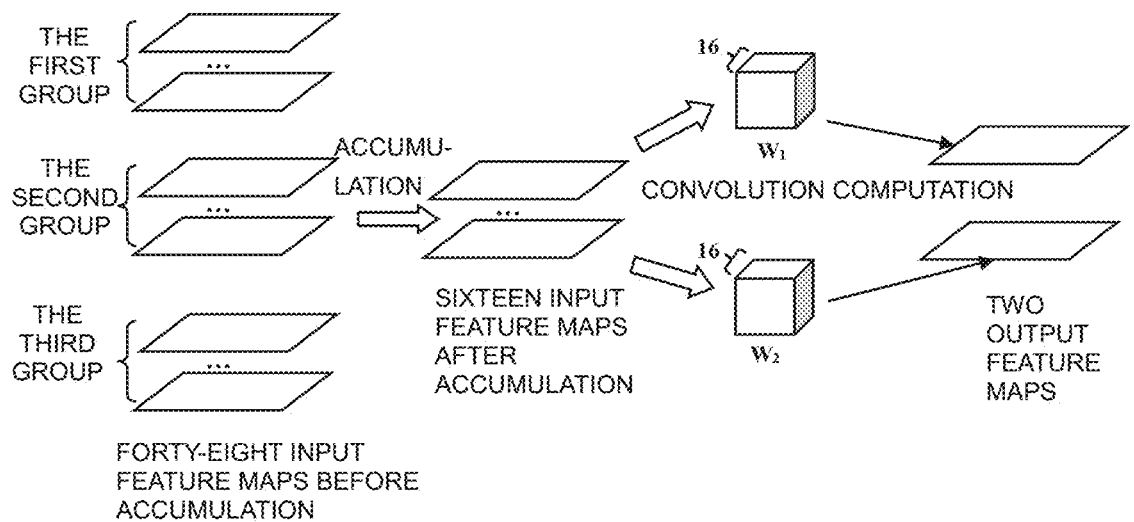
FIG. 14 shows a process of accumulating input feature maps.

Still taking the number of input feature maps (for example, 48) being an integer multiple of the channel number (for example, 16) of the filter as an example, the input feature maps are divided into three groups with 16 input feature maps in each group. One input feature map is read from each group, and one input feature map (three input feature maps in total) read from each group is accumulated into one input feature map element by element. By analogy, until 16 input feature maps in each group are all accumulated, and the accumulated 16 input feature maps are obtained, as shown in FIG. 14. The element by element accumulation here refers to accumulating elements of the same position in the three input feature maps. For example, the elements at the $(h_1, w_2)$ position of the input feature map 1 in the first group, the elements at the $(h_1, w_2)$ position of the input feature map 17 in the second group and the elements at the $(h_1, w_2)$ position of the input feature map 33 in the third group are accumulated to obtain the accumulated elements at the $(h_1, w_2)$ position of the input feature map. Still taking the number of input feature maps (for example, 42) being not an integer multiple of the channel number (for example, 16) of the filter as an example, the input feature maps are divided into three groups, there are 16 input feature maps in the first group and the second group, respectively. There are 10 input feature maps in the third group. One input feature map is read from each group, and the read three input feature maps are accumulated into one input feature map element by element. When 10 accumulated input feature maps are obtained (i.e., the accumulation process is performed for 10 times), the input feature maps in the third group are all accumulated, and then the input feature map is no longer read from the third group. The input feature maps that have not been accumulated in the first group and the second group are read and accumulated, until the 16 input feature maps are obtained.

If the application method in this embodiment is implemented based on the training method of training the multi-layer neural network model by expanding the filter channel number in the first embodiment, the accumulation process in the third embodiment may satisfy the condition that the position of the accumulated input feature map is the same as the position of the input feature map that is computed with the identical channels after expansion in the training method. Here, the meaning of the identical channels is the same as that in the first embodiment, and refers to a channel obtained by expanding the same channel before expansion.

Figure 9:
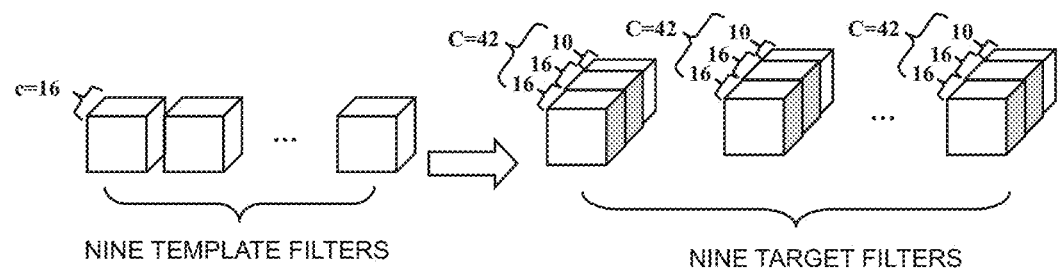

For example, it is assumed that in the training method of the first embodiment, the number of input feature maps of a certain convolutional layer is 42, the channel number of the filter is 16, and by adopting the manner of the first embodiment, the filter channel number is replicated in the manner shown in FIG. 9, to obtain the replicated filter including 42 channels. It is assumed that channel $C_{1-1}$ obtains three identical channels $C_{1-1}$ to $C_{1-3}$ after replicating. 42 input feature maps are convoluted with the channel-expanded filter. At this time, it is assumed that the input feature maps at position 1, position 17, and position 33 correspond to the identical channels $C_{1-1}$ to $C_{1-3}$. In the application method of the third embodiment, the 42 input feature maps having the same number and shape but different element values as those of the input feature maps in the training method are divided into three groups according to the position order, there are 16 input feature maps in the first group and the second group, there are 10 input feature maps in the third group, and the channel number of the filter is 16. When the input feature maps are accumulated, since the positions of the three input feature maps that are computed with the identical channels $C_{1-1}$ to $C_{1-3}$ in the training method are position 1, position 17, and position 33, respectively, three input feature maps located at position 1, position 17, and position 33 respectively selected from three groups are accumulated, to obtain an accumulated input feature map that is performed computation with the channel $C_{1-1}$ in the filter.

Figure 10:
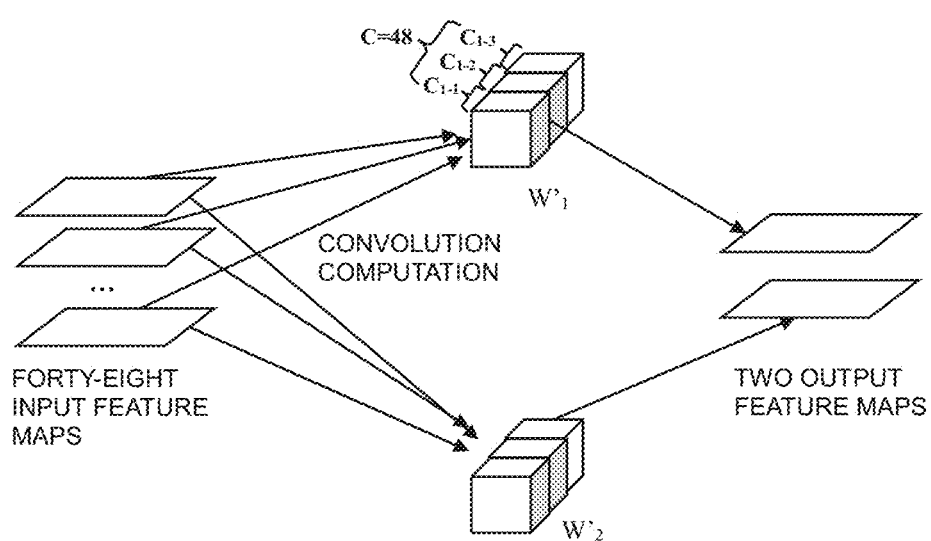
FIG. 10 shows a process of performing convolution using a filter after expanding channels.

With the application method shown in the third embodiment, on the one hand, since the input feature maps are accumulated, and the number of bits of the elements of the input feature map after the accumulation is larger (than the number of bits of the input feature map before the accumulation), the accumulated input feature map retains useful information of the input feature map before the accumulation, without a issue of accuracy degradation due to a large amount of information loss; on the other hand, compared with the convolution process shown in FIG. 10 in the second implementation, the convolution process shown in the third embodiment can effectively reduce the computation amount and improve the computation speed.

Fourth Exemplary Embodiment

Figure 15:
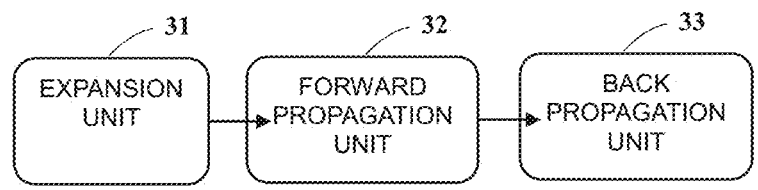
FIG. 15 is a structural schematic diagram of a training apparatus of a fourth exemplary embodiment of the present disclosure.

The fourth exemplary embodiment of the present disclosure describes a training apparatus of a multi-layer neural network model, which is an apparatus having the same inventive concept as the training method in the first exemplary embodiment of the present disclosure. As shown in FIG. 15, the training apparatus includes an expansion unit 31, a forward propagation unit 32, and a back propagation unit 33. Specifically, the expansion unit 31 is used to expand in advance the filter channel number in at least one convolutional layer in the multi-layer neural network model to be trained; the forward propagation unit 32 is used to perform data computation in the convolutional layer by using the channel number-expanded filter based on data for training; the back propagation unit 33 is used to update the gradient value of the weight on the channel before expanding the channel number according to the gradient values of the weights on the identical channels in the channels after expanding the channel number. A training of the network model is implemented, wherein the identical channels are obtained by expanding the same channel before the expansion.

The expansion unit 31 expands the channel number of the filter by replicating the channels of the filter.

The back propagation unit 33 determines gradient value of each weight on the identical channels, averages the gradient values of the weights at the same position on the identical channels, and uses the gradient average value as the gradient value at the position of the weight on the channel before number expansion, of which the gradient value is to be updated.

Fifth Exemplary Embodiment

Figure 16:
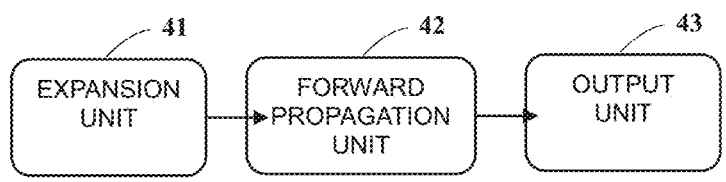
FIG. 16 is a structural schematic diagram of an application apparatus of a fifth exemplary embodiment of the present disclosure.

The fifth exemplary embodiment of the present disclosure describes an application apparatus of a multi-layer neural network model, which is an apparatus having the same inventive concept as the application method in the second exemplary embodiment of the present disclosure. As shown in FIG. 16, the application apparatus includes an expansion unit 41, a forward propagation unit 42, and an output unit 43. Specifically, the expansion unit 41 expands in advance the filter channel number in at least one convolutional layer in the multi-layer neural network model; the forward propagation unit 42 performs the data computation in the convolutional layer by using channel number-expanded filter based on the data corresponding to the task request; the output unit 43 outputs the application result after performing the forward propagation.

The expansion unit 41 expands the channel number of a filter by replicating the channel of the filter.

Sixth Exemplary Embodiment

Figure 17:
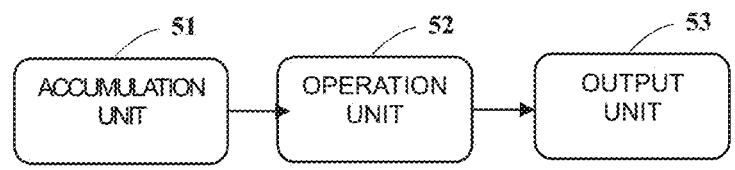
FIG. 17 is a structural schematic diagram of an application apparatus of a sixth exemplary embodiment of the present disclosure.

The sixth exemplary embodiment of the present disclosure describes an application apparatus of a multi-layer neural network model which is an apparatus having the same inventive concept as the application method in the third exemplary embodiment of the present disclosure. As shown in FIG. 17, the application apparatus includes an accumulation unit 51, a computation unit 52, and an output unit 53. Specifically, the accumulating unit 51 is used to accumulate a plurality of input feature maps of the convolutional layer for at least one convolutional layer during forward propagation; the computation unit 52 performs a convolution computation in the convolutional layer by using the accumulated input feature map and the filter in the convolutional layer; the output unit 53 outputs the application result after completing the forward propagation.

The accumulating unit 51 is used to group the plurality of input feature maps such that the number of input feature maps in the group is equal to the channel number of the filter in the convolutional layer, and the number of input feature maps in at most one group is smaller than the channel number of the filter, and to accumulate the input feature maps in each group to obtain accumulated input feature maps whose number is equal to the channel number of the filter.

In the training method for the multi-layer neural network model before applying the method, in a case of performing the computation using the filter with the expanded channel number and the input feature map by expanding the channel number of the filter, the accumulating unit 51 is used to accumulate an input feature map in each group that satisfies the following condition: the position of the accumulated input feature map in the plurality of input feature maps is the same as the position of the input feature map that is performed the computation with the expanded identical channels in the training method, and the identical channels are obtained by expanding the same channel before the expansion.

OTHER EMBODIMENTS

Embodiments of the present disclosure can also be realized by a computer of a system or apparatus that reads out and executes computer executable instructions recorded on a storage medium (which can also be more completely referred to as non-transitory computer-readable storage medium) to perform the functions of one or more of the above-described embodiment(s), and/or includes one or more circuits (such as an application specific integrated circuit (ASIC))used to perform the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling one or more circuits to perform the functions of one or more of the above-described embodiment(s). The computer may comprise one or more processors such as a central processing unit (CPU), micro processing unit (MPU), and may include a network of separate computers or separate processors to read out and execute computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The embodiment of the present disclosure can also be implemented by providing a software (program) for executing the functions of the above embodiments to a system or an apparatus through a network or various storage medium, and reading and executing the program by the computer or a processing unit (CPU) and a micro processing unit (MPU) of the system or apparatus.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A training method for training a multi-layer neural network model comprising:
    setting a multi-layer neural network to be trained;
    for at least one convolutional layer in the multi-layer neural network model to be trained, expanding a number of channels of a filter of the at least one convolutional layer by replicating at least part of existing channels of the filter and adding the replicated channels to the existing channels in the filter;
    performing forward propagation for training data in the multi-layer neural network model to be trained, wherein data computation in the at least one convolutional layer is performed with the filter of which the number of channels has been expanded;
    performing back propagation in the multi-layer neural network model to be trained, to determine a gradient value of a weight on each channel of the filter of which the number of channels has been expanded; and
    updating the determined gradient value of the weight on each existing channel of the filter which has existed since before expanding the number of channels, based on the determined gradient values of weights on one existing channel of existing channels and a corresponding replicated channel of the replicated channels of the filter obtained by replicating the existing channel.

2. A data processing method using a multi-layer neural network model comprising:
    setting a trained multi-layer neural network model which has been trained by the training method according to claim 1;
    performing forward propagation for input data in the trained multi-layer neural network model, wherein data computation in the at least one convolutional layer is performed with the filter of which the number of channels has been expanded; and
    outputting a result of the forward propagation.

3. The data processing method according to claim 2, wherein
- a height of the filter after expanding the number of channels is not smaller than the height of the filter before expanding the number of channels, and
- a width of the filter after expanding the number of channels is not smaller than the width of the filter before expanding the number of channels.

4. The training method according to claim 1, wherein
- a height of the filter after expanding the number of channels is not smaller than the height of the filter before expanding the number of channels, and
- a width of the filter after expanding the number of channels is not smaller than the width of the filter before expanding the number of channels.

5. The training method according to claim 1, wherein the updating the gradient value of a weight on each existing channel, comprises:
- averaging gradient values of weights at a same position on each existing channel and all of corresponding replicated channels obtained by replicating the existing channel; and
- taking the averaged gradient value as the updated gradient value of the weight at the same position on the existing channel.

6. A non-transitory computer-readable storage medium storing instructions that, when executed by a computer, cause the computer to perform a data processing method using multi-layer neural network model, the method comprising:
- setting a trained multi-layer neural network model which has been trained by the training method according to claim 1;
- performing forward propagation for input data in the trained multi-layer neural network model, wherein data computation in the at least one convolutional layer is performed with the filter of which the number of channels has been expanded; and
- outputting a result of the forward propagation.

7. A training apparatus for training a multi-layer neural network model comprising:
- one or more processors; and
- one or more memories coupled to the one or more processors, the one or more memories having stored thereon instructions which, when executed by the one or more processors, cause the apparatus to:
- set a multi-layer neural network to be trained;
- expand a number of channels of a filter for at least one convolutional layer in the multi-layer neural network model to be trained, by replicating at least part of existing channels of the filter and adding the replicated channels to the existing channels in the filter;
- perform forward propagation for training data in the multi-layer neural network model to be trained, wherein data computation in the at least one convolutional layer is performed with the filter of which the number of channels has been expanded;
- perform back propagation in the multi-layer neural network model to be trained, to determine a gradient value of a weight on each channel of the filter of which the number of channels has been expanded; and
- update the determined gradient value of the weight on each existing channel of the filter which has existed since before expanding the number of channels, based on the determined gradient values of weights on one existing channel of existing channels and a corresponding replicated channel of the replicated channels of the filter obtained by replicating the existing channel.

8. A data processing apparatus using a multi-layer neural network model comprising:
- one or more processors; and
- one or more memories coupled to the one or more processors, the one or more memories having stored thereon instructions which, when executed by the one or more processors, cause the apparatus to:
- set a trained multi-layer neural network model which has been trained by the training apparatus according to claim 7;
- perform forward propagation for input data in the trained multi-layer neural network model, wherein data computation in the at least one convolutional layer is performed with the filter of which the number of channels has been expanded; and
- output a result of the forward propagation.

9. The training apparatus according to claim 7, wherein the update the determined gradient value of a weight on each existing channel is updated by averaging gradient values of weights at the same position on the existing channel and all of replicated channels obtained by replicating the existing channel, and taking the averaged gradient value as the updated gradient value of the weight at the same position on the existing channel.

10. A non-transitory computer-readable storage medium storing instructions that, when executed by a computer, cause the computer to perform a training method for training a multi-layer neural network model, the method comprising:
- setting a multi-layer neural network to be trained;
- for at least one convolutional layer in the multi-layer neural network model to be trained, expanding a number of channels of a filter of the at least one convolutional layer by replicating at least part of existing channels of the filter and adding the replicated channels to the existing channels in the filter;
- performing forward propagation for training data in the multi-layer neural network model to be trained, wherein data computation in the at least one convolutional layer is performed with the filter of which the number of channels has been expanded;
- performing back propagation in the multi-layer neural network model to be trained, to determine a gradient value of a weight on each channel of the filter of which the number of channels has been expanded; and
- updating the determined gradient value of the weight on each existing channel of the filter which has existed since before expanding the number of channels, based on the determined gradient values of weights on one existing channel of existing channels and a corresponding replicated channel of the replicated channels of the filter obtained by replicating the existing channel.

* * * * *